(12) United States Patent
Takada (10) Patent No.: US 6,707,588 B2
(45) Date of Patent: Mar. 16, 2004

(54) PHOTONIC CRYSTAL DEVICE (75) Inventor: Kyu Takada, Otsu (JP)

(73) Assignee: Minolta Co., Ltd., Osaka (JP)

( * ) Notice: Subject to any disclaimer, the term of this patent is extended or adjusted under 35 U.S.C. 154(b) by 107 days.

(21) Appl. No.: 09/818,304

(22) Filed: Mar. 27, 2001

(65) Prior Publication Data

US 2001/0033409 A1 Oct. 25, 2001

(30) Foreign Application Priority Data

Mar. 27, 2000 (JP) ........................................ 2000-090690

(51) Int. Cl.⁷ ............................... G02F 1/03; G02F 1/07
(52) U.S. Cl. ....................................................... 359/241
(58) Field of Search ................................ 359/192, 247, 359/274, 241, 253, 252, 250; 385/1, 2, 37, 129, 144; 257/417

(56) References Cited

U.S. PATENT DOCUMENTS

| | | | | |
|---|---|---|---|---|
| 4,725,511 A | * | 2/1988 | Reber ...................... 29/896.32 |
| 5,370,768 A | * | 12/1994 | Mersereau et al. ............ 216/26 |
| 5,389,943 A | * | 2/1995 | Brommer et al. ............ 343/909 |
| 6,035,089 A | * | 3/2000 | Grann et al. ................. 385/129 |
| 6,052,213 A | * | 4/2000 | Burt et al. ................... 359/237 |

* cited by examiner

Primary Examiner—Hung Xuan Dang
Assistant Examiner—Joseph P. Martinez
(74) Attorney, Agent, or Firm—Sidley Austin Brown & Wood LLP (57) ABSTRACT

A photonic crystal device including a method of forming the photonic crystal device is provided wherein the photonic crystal device comprises a first medium having a thickness and periodically defining a plurality of periodically spaced concave portions. The concave portions having a depth less than the thickness of the first medium. A second medium fills the concave portions. One layer of the device, including both the first and second medium, acts as an optical waveguide layer, or photonic crystal. Another layer is at least partially formed from the first medium, such that the first and second layers share a common medium. A method of forming the photonic crystal device including the steps of applying a resist layer to a first medium, removing portions of the resist layer and corresponding portions of the first medium to form vacancies, and filling the vacancies with a second medium.

10 Claims, 5 Drawing Sheets

PHOTONIC CRYSTAL DEVICE

RELATED APPLICATION

This application is based on application Ser. No. 2000-90690 filed in Japan, the content of which is hereby incorporated by reference herein in its entirety.

FIELD OF THE INVENTION

The present invention relates to an optical device for splitting and combining beams of light and a method of manufacturing the optical device. More particularly, the invention relates to a photonic crystal device comprising a photonic crystal layer formed in a layer where a plurality of media with different refractive indices are periodically arranged and a method of manufacturing such a device.

BACKGROUND OF THE INVENTION

Figure 6:
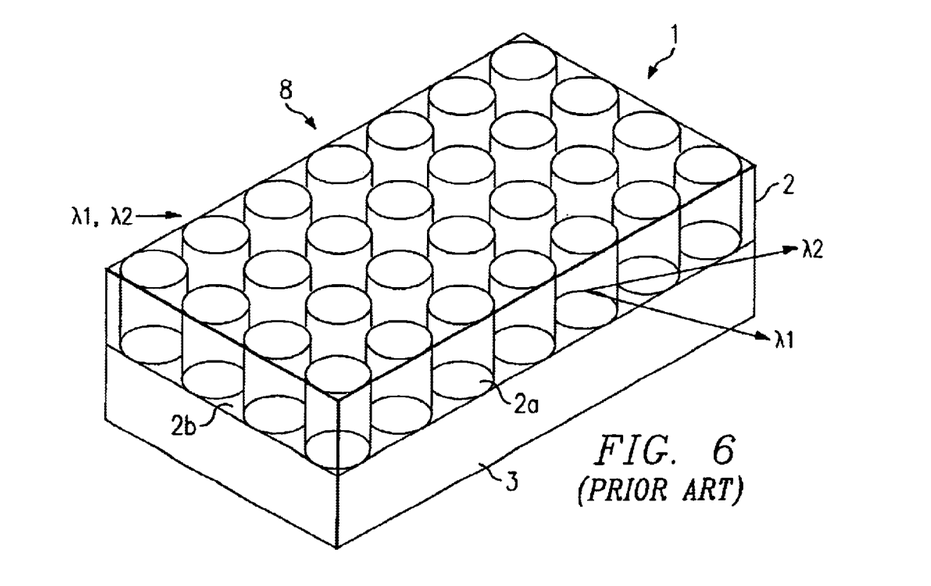
FIG. 6 is a perspective view showing a conventional photonic crystal device of the prior art.

A conventionally designed prior art optical functional device having a photonic crystal where a plurality of media with different refractive indices are periodically arranged has a structure as shown in FIG. 6. In the prior art optical functional device 1, an optical waveguide layer 2 is laminated on a clad layer 3. The clad layer 3 comprises a medium having a lower refractive index than the optical waveguide layer 2. Above the optical waveguide layer 2 in the figure is an air layer 8 having a lower refractive index than the optical waveguide layer 2. Since the optical waveguide layer 2 is thus sandwiched between media with lower refractive indices, the light incident on the optical waveguide layer 2 is redirected while being trapped in the optical waveguide layer 2.

The optical waveguide layer 2 comprises a photonic crystal 2 where media 2a and 2b with different refractive indices are periodically arranged. For example, as shown in FIG. 6, a photonic crystal 2 where a cylindrical medium 2a comprising air and a medium 2b comprising silicon are two-dimensionally periodically arranged can be formed by defining vacancies 2a in a silicon thin film 2b at predetermined intervals.

Photonic crystals have a characteristic that causes anisotropy of refractive index dispersion. By appropriately selecting the refractive indices of the media 2a and 2b, the shapes of the media 2a and 2b such as a cylinder or a prism, the kind of the grating such as a triangular grating or a square grating, and the period of the arrangement, different optical characteristics can be obtained for light beams of desired wavelengths and polarization directions.

By doing this, for example, light beams of wavelengths $\lambda 1$ and $\lambda 2$ incident from the same direction can be made to exit in different directions as shown in FIG. 6. Such devices can also be adapted to make light beams of different wavelengths being incident from different directions exit in the same direction. Moreover, photonic crystal devices can be adapted to reflect a light beam of a specific wavelength. By employing this characteristic, photonic crystals can be used as light signal splitters and combiners, or filters.

Figure 7A:
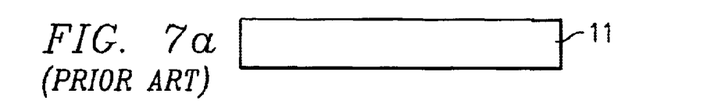
FIGS. 7(a)–7(g) are cross-sectional views showing the process of manufacturing the conventional photonic crystal device of the prior art.
Figure 7B:
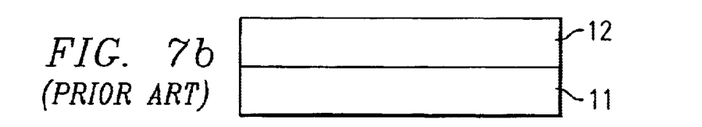
Figure 7C:
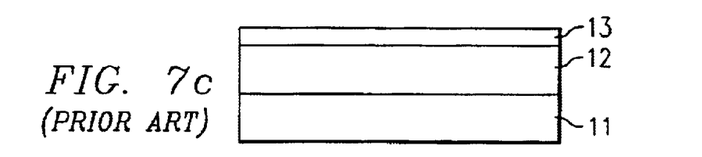
Figure 7D:
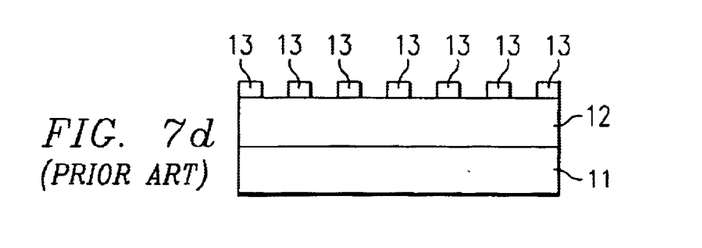

As demonstrated in FIGS. 7(a)–7(g), the optical functional device 1 of the prior art is manufactured by a process requiring numerous steps. Referring first to FIG. 7(a), a substrate 11 serves as the claim layer 3 of FIG. 6. Referring to FIG. 7(b), to that layer, a film of a medium 12 of a material such as silicon is formed. Then, as shown in FIG. 7(c), a resist layer 13 is applied to the medium 12. As shown in FIG. 7(d), the resist layer 13 is formed into a predetermined periodic pattern or shape.

Figure 7E:
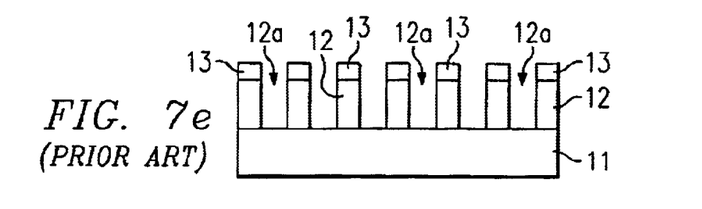
Figure 7F:
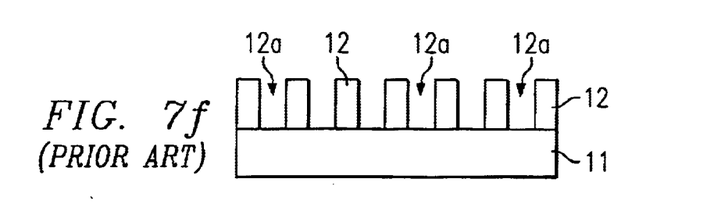

Referring now to FIG. 7(e), periodically arranged concave portions 12a defined through the medium 12 may be formed by a method such as etching. By removing the resist layer 13, as shown in FIG. 7(f), a photonic crystal is formed where air in the concave portions 12a and the medium 12 are two-dimensionally periodically arranged.

Figure 7G:
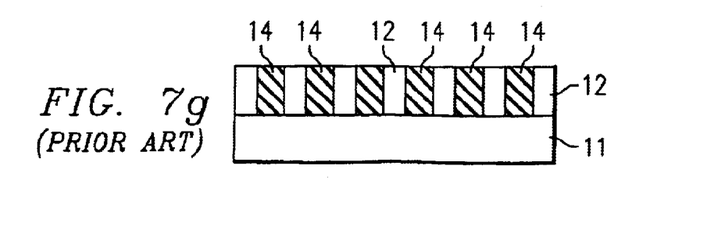
Figure 8A:
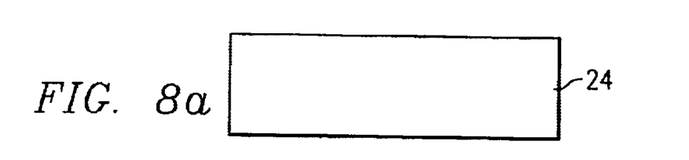
FIGS. 8(a)–8(f) are cross-sectional views showing an alternate manufacturing process of the photonic crystal device according to the first embodiment.
Figure 8B:
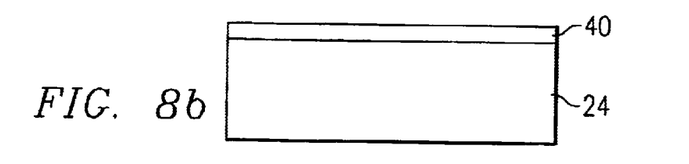
Figure 8C:
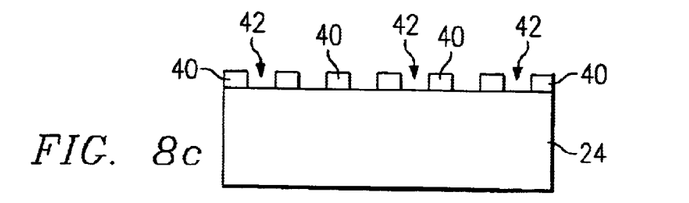
Figure 8D:
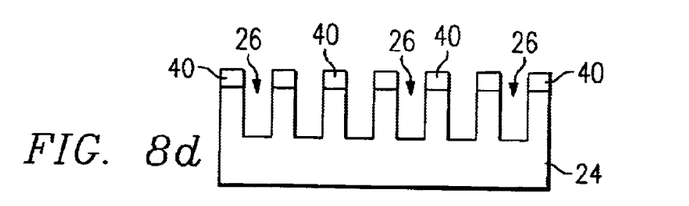
Figure 8E:
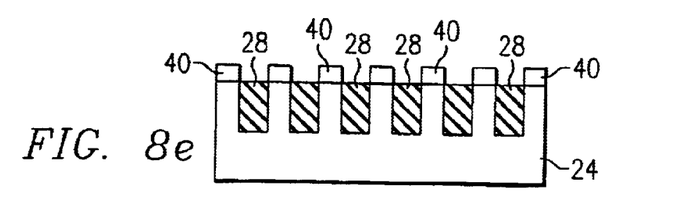
Figure 8F:
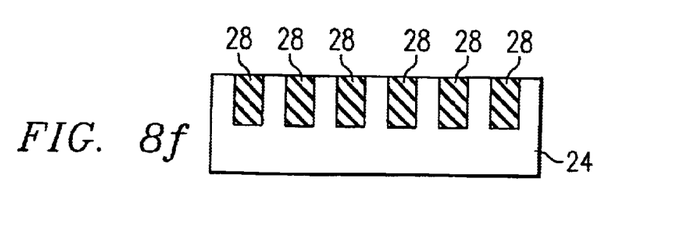

Referring to FIG. 7(g), by filling the concave portions 12a with a medium 14, a photonic crystal is obtained where the medium 12 and the medium 14 are two-dimensionally periodically arranged and have different optical characteristics. Consequently, the optical functional device 1 is obtained where the clad layer 3 shown in FIG. 6 comprises the substrate 11 and the media 2a and 2b comprise the media 12 and 14.

Alternately, optical functional devices of the prior art as shown in FIG. 6 may be manufactured wherein the optical waveguide layer 2 comprises a periodic porous material formed by a method such as anodic oxidation and is bonded or fused to the clad layer 13.

However, according to the prior art conventional method of forming a photonic crystal device 1, since the optical waveguide layer 2 is integrated with the clad layer 3 by laminating or bonding it to the clad layer 3, the number of manufacturing steps and therefore the number of man-hours is large, thereby increasing the cost. In addition, the optical waveguide layer 2 and the clad layer 3 may be readily and undesirably separated, which decreases the yield.

SUMMARY OF THE INVENTION

An object of the present invention is to provide an improved photonic crystal device.

Another object of the present invention is to provide a photonic crystal device wherein cost reduction is achieved by reducing the number of man-hours required to form the device.

Yet another object of the present invention is to provide a photonic crystal device which has inseparable layers thereby improving the yield.

These objects are achieved by a multi-layer photonic crystal device comprising a medium which is commonly and integrally formed in at least two layers of the device. The photonic crystal device of the first embodiment comprises a first medium having a thickness and periodically defining a plurality of cylindrically-shaped concave portions throughout. The concave portions have a depth which is less than the thickness of the first medium. A second medium, preferably having a higher refractive index than the first medium, is filled in the concave portions. This creates a first layer comprising a mixed media of cylinders of the second medium periodically interspersed with the first medium forming a photonic crystal. Depending on the average index of refraction of the first layer, the photonic crystal layer may or may not also be an optical waveguide layer. In the preferred embodiment where the second medium has a higher index of refraction than the first medium, this mixed media first layer (photonic crystal) is the optical waveguide layer which results from the periodically arranged first medium and second medium of the first layer due to the different indices of refraction between the two media.

In the preferred embodiment, a second layer of the photonic crystal device, a layer adjacent the mixed media first layer, is entirely formed from the first medium. Since the refractive index of the first medium is lower than that of the second medium, the first layer has an overall higher average refractive index than the second layer. The first layer, which forms the optical waveguide layer, is disposed between the second layer and a layer of air, which also has a lower refractive index than the first layer. Consequently, the light incident on the first (optical waveguide) layer can be redirected while being trapped in the optical waveguide layer.

The photonic crystal device is preferably manufactured by a process wherein a resist layer is applied to a first medium, which is preferably formed as a consistent thickness, consistent material structure, in a resist layer applying step. Then, the resist layer is formed into a predetermined periodic pattern or shape in a patterning step by removing portions of the resist layer. Portions of the first medium corresponding to the periodic pattern of the resist layer are then removed in a concave portion defining step. The resist layer is then removed in a resist layer removing step. Finally, the second medium, preferably having a different index of refraction than the first medium, is filled in the concave portions and any of the second medium outside of or overflowing from the concave portions is removed in a second medium removing step. Alternately, the resist layer may be removed after the filling step, thereby eliminating the need for the final second medium removing step.

BRIEF DESCRIPTION OF THE DRAWINGS

These and other objects and features of this invention will become clear from the following description, taken in conjunction with the preferred embodiments with reference to the accompanied drawings in which.

DESCRIPTION OF THE PREFERRED EMBODIMENT

Hereinafter, embodiments of the present invention will be described with reference to the drawings with like parts numbered similarly incremented by 100.

Figure 1:
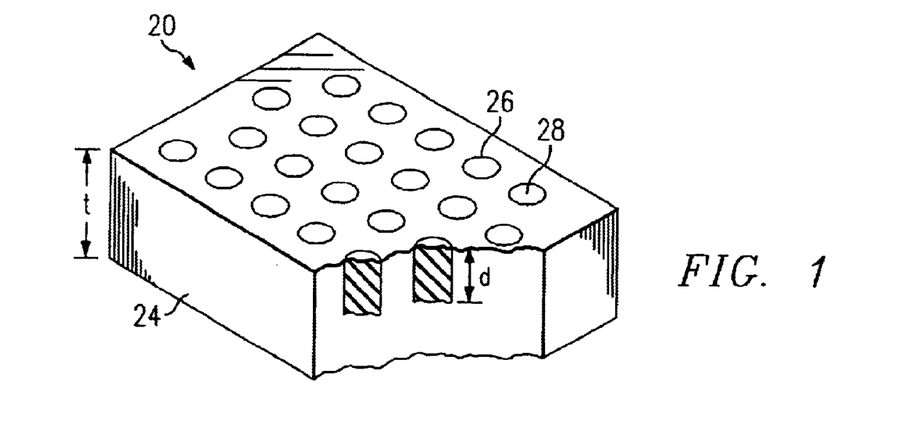
FIG. 1 is a perspective view showing a photonic crystal device according to a first embodiment.
Figure 2:
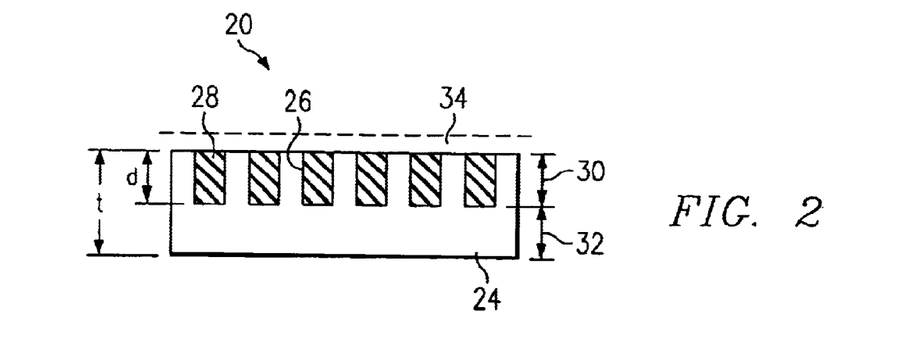
FIG. 2 is a side cross-sectional view showing the photonic crystal device according to the first embodiment.

FIGS. 1 and 2 are a schematic perspective view and a side cross-sectional view respectively, each showing a photonic crystal device according to a first embodiment. The photonic crystal (optical functional) device 20 of the first embodiment is formed as a multi-layer optical device having at least one medium in common in at least two of the layers. The photonic crystal device 20 of the first embodiment comprises a first medium 24 having a thickness t and periodically defining a plurality of cylindrically-shaped concave portions 26 throughout. The concave portions 26 have a depth d which is less than the thickness t of the first medium 24. A second medium 28 is filled in the concave portions 26 creating a first portion or layer 30, comprising a mixed media of cylinders of the second medium 28 periodically interspersed with the first medium 24 and forming a photonic crystal layer 30. In the preferred embodiment, the second medium 28 has a higher index of refraction than the first medium 24. Depending on the average index of refraction of the first layer (photonic crystal layer), this mixed media first layer 30 may form an optical waveguide layer which results due to the different indices of refraction occurring from the periodically arranged first medium 24 and the second medium 28 when the second medium has a greater index of refraction than the first medium.

A second portion or layer 32 of the optical functional device 20, a layer adjacent the mixed media first layer 30, is entirely formed from the first medium 24. Since in the preferred embodiment, the refractive index of the first medium 24 is lower than that of the second medium 28, the first layer has an overall higher average refractive index than the second layer 32. The first layer 30, which forms the optical waveguide layer, is disposed between the second layer 32 and a layer of air 34, which also has a lower refractive index than the first layer 30. Consequently, the light incident on the first (optical waveguide) layer 30 can be directed to a different path while being trapped in the optical waveguide layer.

Figure 3A:
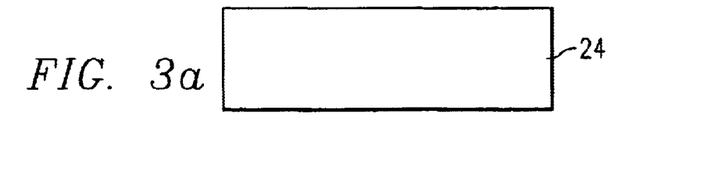
FIGS. 3(a)–3(f) are cross-sectional views showing the manufacturing process of the photonic crystal device according to the first embodiment.
Figure 3B:
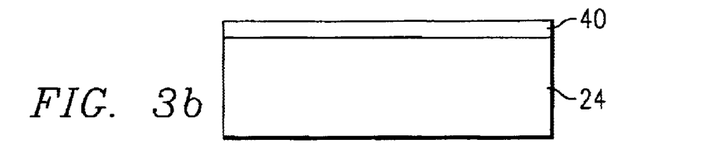

The photonic crystal device 20 of the first embodiment is preferably manufactured by a process shown in FIGS. 3(a)–3(f). Referring to FIGS. 3(a) and 3(b), a resist layer 40 is applied to the first medium 24 in a resist layer applying step. The first medium 24 may be formed from a substrate having a desired refractive index, or a thin film of the first medium 24 may be formed on a platform substrate.

Figure 3C:
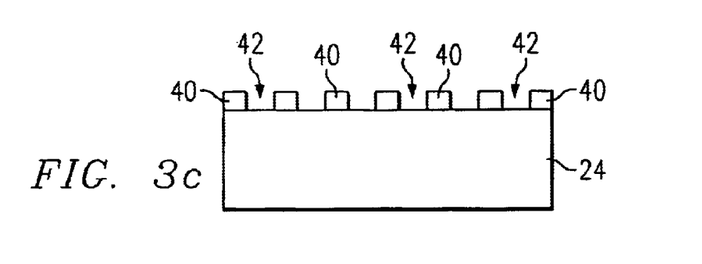
Figure 3D:
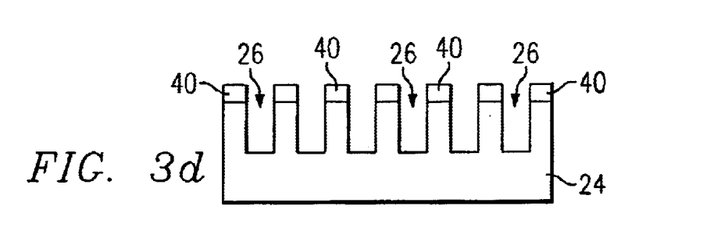

Then, as shown in FIG. 3(c), the resist layer 40 is formed into a predetermined periodic pattern or shape in a patterning step by removing portions 42 of the resist layer 40. As shown in FIG. 3(d), periodically arranged concave portions 26, preferably corresponding in position to the removed portions 42 of the resist layer 40, may be defined in the first medium 24 by etching in an etching step.

Figure 3E:
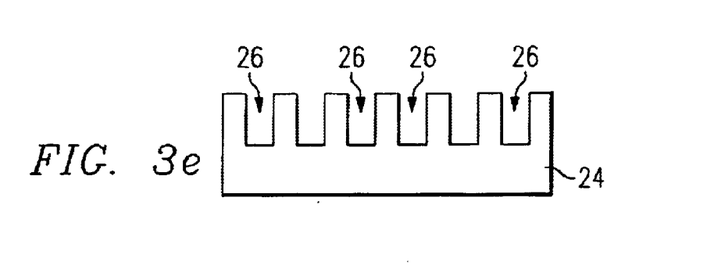
Figure 3F:
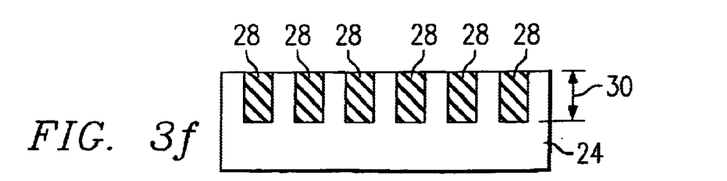

Referring to FIG. 3(e), the resist layer 40 is then removed in a resist layer removing step. Finally, as shown in the filling step of FIG. 3(f), the second medium 28 is filled in the concave portions 26 by a method such as sputtering. At this time, a thin film of the second medium 28, which may have formed on the surface of the first medium 24 during the filling step, is removed by a method such as etching. By the above-described manufacturing process, the optical functional device 20 of the first embodiment is obtained comprising a photonic crystal in the first layer 30 where the first medium 24 and the second medium 28 are two-dimensionally periodically arranged.

Referring again to FIGS. 1 and 2, according to the first embodiment, since the second layer 32 comprises the first medium 24, which is also one of the different media 24 and 28 at least partially forming the first (optical waveguide) layer 30, no film forming step is necessary to form the optical waveguide layer 30. Eliminating this step reduces the number of man-hours required to manufacture the optical functional device. Moreover, since the second layer, which is preferably formed entirely of the first medium, and the first medium of the first (optical waveguide) layer 30 are integrally formed, the two layers resist separation thereby increasing the yield. Consequently, the cost of the optical functional device 20 is reduced.

Referring to FIGS. 8(a)–8(f), an alternate manufacturing process is disclosed which eliminates the need to separately remove the resist layer 40 and any overflow of the second medium 28. According to the alternate method, the resist layer 40 remains in place until after the concave portions 26 are filled. Then, in a single step, both the resist layer 40 and any overflow of the second medium can simultaneously be removed.

Figure 4:
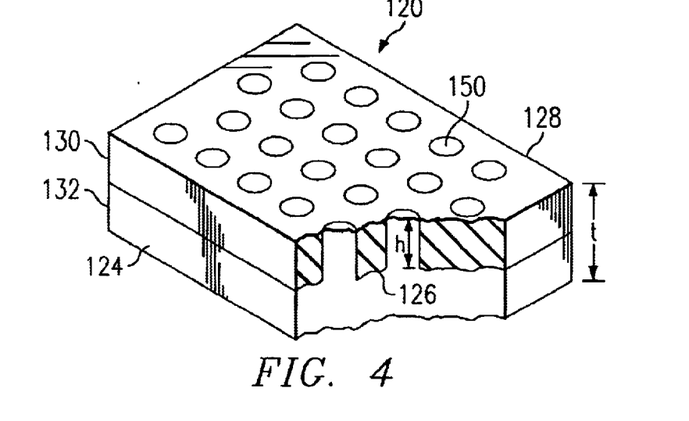
FIG. 4 is a perspective view showing a photonic crystal device according to a second embodiment.

FIG. 4 is a perspective view showing a photonic crystal device 120 according to a second embodiment. As with the first embodiment, the photonic crystal (optical functional) device 120 of the second embodiment is formed as a multi-layer photonic crystal device having at least one medium in common in at least two of the layers. The device of the second embodiment comprises a first medium 124 having a thickness t and periodically defining a plurality of cylindrically-shaped protruding portions 150 extending upwardly throughout and defining a cavity region 126 which surrounds the protruding portions 150. The protruding portions 150 have a height h which is less than the thickness t of the first medium 124. A second medium 128, having a higher index of refraction than the first medium 124, is filled in the cavity region 126 surrounding the protruding portions 150 creating a first layer 130, comprising a mixed media of cylinders of the first medium 124 periodically surrounded by the second medium 128. This mixed media first layer 130 is the optical waveguide layer, which forms a photonic crystal resulting from the periodically arranged first medium 124 and the second medium 128 due to the different indices of refraction of the two media.

As with the first embodiment, a second layer 132 of the photonic crystal device 120, a layer adjacent the mixed media first layer 130, is entirely formed from the first medium 124. Since the refractive index of the first medium 124 is lower than that of the second medium 128, the first layer has an overall higher average refractive index than the second layer 132. As with the first embodiment, the first layer 130 of the second embodiment, forming the optical waveguide layer, is disposed between the second layer 132 and a layer of air 134, which also has a lower refractive index than the first layer 130. Consequently, the light incident on the first optical waveguide layer 130 can be redirected to a different path while being trapped in the optical waveguide layer.

The second embodiment may be manufactured in a similar manner to the method described above in FIGS. 3(a)–3(f) for the first embodiment. In the process of manufacturing the optical functional devices 20, 120 according to the first and the second embodiments, the steps from the resist applying step to the resist removing step of FIGS. 3(b) to 3(e) constitute a concave portions/region forming step in which the concave portions/region are formed. The concave portions/region forming step can be performed also by beam processing using electron beams. In the case of the cylindrically-shaped concave portions of the first embodiment, the concave portion forming step may be performed by forming a porous member such as porous alumina by a method such as anode oxidation or anodization. In the case of the concave region surrounding the cylindrically-shaped protruding portions, such as with the second embodiment, processing may be performed by machining using a diamond cutter or the like.

Figure 5:
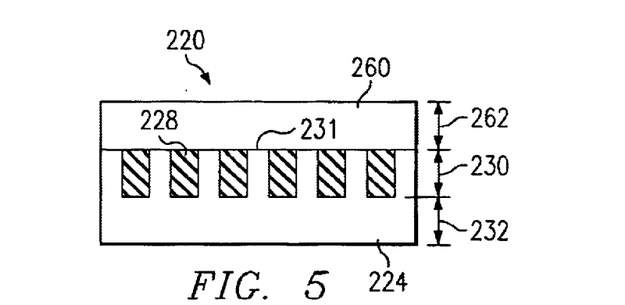
FIG. 5 is a side cross-sectional view showing a photonic crystal device according to a third embodiment.

Referring now to FIG. 5, a side cross-sectional view demonstrating a photonic crystal device 220 according to a third embodiment is shown. In the third embodiment, a film 262 of a third medium 260 is formed on a surface 231 of a photonic crystal device 220 formed according to the first embodiment (shown in FIGS. 1 and 2), such that the optical waveguide layer 230 is sandwiched between the first medium 224 and the film 262 of the third medium 260. It will be appreciated by those skilled in the art that the third medium 260 may be the same or different material as the first medium 224, so long as the index of refraction of the third medium 260 is different than, and preferably less than, an average index of refraction of the optical waveguide layer 230.

According to the third embodiment, the difference in refractive index between the optical waveguide layer 230 and the second layer 232 is smaller than that in a case where a layer adjacent the first (optical waveguide) layer 230 is air, so that the loss due to dispersion of light directed in the first (optical waveguide) layer 230 is reduced. Moreover, like the first and the second embodiments, reduction in the number of man-hours and improvement in yield are achieved for the third embodiment, so that the cost of the photonic crystal (optical functional) device 220 is reduced.

With respect to the above described embodiments, the period of the periodical structure of the optical waveguide layer 230 is decided according to the wavelength of the desired light propagated through the optical waveguide layer 230. In the above described embodiments, to obtain a predetermined optical characteristic for light of a long wavelength such as far-infrared rays, it is necessary that the spacing of the alternating pattern of the first medium 24, 124, 224 and second medium 28, 128, 228 respectively be large. As an example, in a case where a laser beam with a wavelength of 780 nm is propagated, when the refractive indices of the two media are 1.5 and 2.5 and the area ratio between the two media is 1:1, the average refractive index of the first (optical waveguide) layer is 124. Since a photonic-crystal-like characteristic such as a band gap or wavelength dispersion is exhibited when the period is in the vicinity of an integral multiple (approximately once to three times) of half the wavelength (390 nm) in the medium, the period is set to a value in the vicinity of 195 nm or 390 nm.

When ease of processing is considered, it is desirable that the period be 390 nm. For propagation light of 1500 nm frequently used in the communication wave band, the period is set to 375 nm or 750 nm. While the optical waveguide layer has a two-dimensional structure in the above-described embodiments, it may have a three-dimensional structure.

According to the above-described embodiments, since the second layer comprises one of the different media constituting the first (optical waveguide) layer, no film forming step is necessary for the first (optical waveguide) layer forming the photonic crystal, so that the number of man-hours required to manufacture the device is reduced. Moreover, since the second layer, which is preferably formed entirely from the first medium, and the first medium of the first (optical waveguide) layer are integrally formed, the two layers resist separation thereby increasing the yield. As a result, the cost of manufacturing the optical functional device is reduced.

Moreover, according to the above-described embodiments, since the average refractive index of the first (optical waveguide) layer is higher than the refractive index of either the second layer or a layer of either air or another material, light incident on the first (optical waveguide) layer can easily be redirected while being trapped in the first (optical waveguide) layer.

While it is preferable that the second medium have a higher index of refraction than the first medium, as was described for the first through third embodiments, it is possible to form a photonic crystal (optical functional) device according to the above described processes and similar in design to the above described embodiments, wherein the second medium used to form the device has a lower index of refraction than the first medium. According to a fourth embodiment (shown by reference to FIGS. 1–5), the index of refraction of the second medium is lower than the index of refraction of the first medium. That is to say, the average index of refraction of the first layer is lower than that of the second layer. This combination results in a photonic crystal having similar optical characteristics and properties to the above described first through third embodiments, i.e., it redirects incident light, but which does not act as a waveguide, i.e., light is directed outside the photonic crystal layer.

Figure 9:
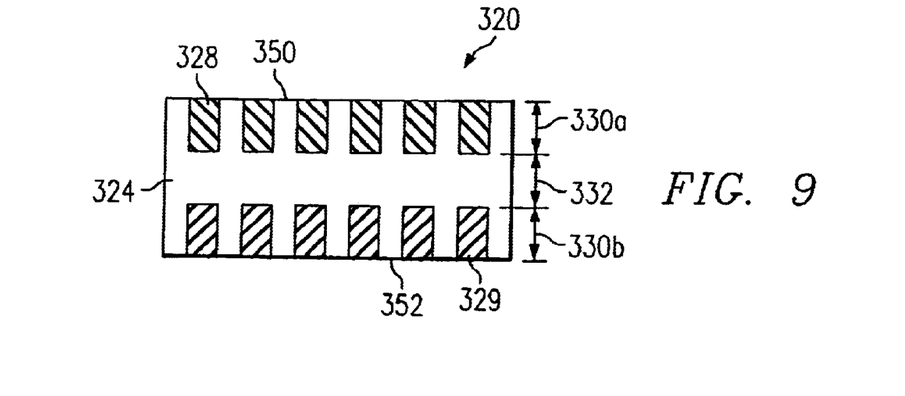
FIG. 9 is a cross-sectional view showing a photonic crystal device having dual photonic crystal layers.

Referring to FIG. 9, a fifth embodiment of the present invention is shown. The photonic crystal device 320 of the fifth embodiment comprises three layers 330a, 330b, 332 each formed at least partially from a first medium 324. The photonic crystal device of the fifth embodiment may be formed similarly to the first through fourth embodiments, but such that the device has two photonic crystal layers and such that at least two of the three layers have a different average index of refraction than another of the three layers.

As shown in FIG. 9, concave portions 226 are defined in the first medium in each of two opposing sides 350, 352 of the first medium 324. The concave portions 350, 352 in each of the opposing sides of the first medium are filled with a second medium 328 having a different index of refraction than the first medium 324. The three layers 330a, 330b, 332, devised as described above, form a dual photonic crystal device 320. It will be appreciated by those skilled in the art that the concave portions 350, 352 on one of the opposing sides could instead be filled with a third medium 329 having a different index of refraction than either the first medium 324 or the second medium 328.

Although the present invention has been fully described by way of example with reference to the accompanying drawings, it is to be understood that various changes and modifications will be apparent to those skilled in the art. For example, it will be appreciated by those skilled in the art that the size, shape, and number of the concave portions/ protruding portions may be other than described. For example, and not by way of limitation, the shape could be a shape other than cylindrical including but not limited to rectangular, triangular or irregularly shaped. While it is preferable that the second layer be formed entirely of the first medium, it will be appreciated by those skilled in the art that the second layer could be formed from a combination of media in a similar manner as that of the first waveguide layer so long as the two layers share at least one common medium and so long as the average index of refraction of the second layer is different than the average index of refraction of the first layer. Also, with respect to the dual photonic crystal device of the fifth embodiment, it is not necessary that the two photonic crystal layers have corresponding alternating first and second media portions, nor is it necessary that the depth of the concave portions of one side of the photonic crystal device be the same as the depth of the concave portions on the other side. Further, although it is preferable that the first medium thickness be uniform prior to applying the resist layer, it is not necessary. Still further, although it is preferable to have consistent depths and consistent thickness of the concave portions, this is not necessary. Moreover, it will be appreciated by those skilled in the art that other methods of forming the device may be employed such that the layers include a consistent material and are formed such that the layers are essentially inseparable. Therefore, unless such changes and modification depart from the scope of the present invention, they should be construed as being included therein.

What is claimed is:

1. An optical device comprising:
   a first medium having a thickness, the first medium defining a plurality of periodically spaced hollow portions having a depth less than the thickness of the first medium; and
   a second medium being dispersed within the hollow portions formed in the first medium,
   wherein a first layer of the device forms a photonic crystal formed partially of the first medium having a depth identical to the depth of the hollow portions, and
   wherein a second layer of the device is formed entirely of the first medium.

2. An optical device according to claim 1 wherein the index of refraction of the second medium is greater than the index of refraction of the first medium.

3. A method of manufacturing an optical device having a first layer functioning as an optical waveguide layer and a second layer functioning as a base layer, the method comprising the steps of:
   providing a resist layer on a surface of a first medium;
   removing portions of the resist layer to form vacancies;
   removing portions of the first medium corresponding to the vacancies to create cavities in the first medium, the depth of the cavities being less than a thickness of the first medium, and thereby defining the first layer and second layer;
   removing the resist layer completely;
   filling the cavities in the first medium with a second medium, thereby forming the optical waveguide layer; and
   removing any excess film of the second medium from the surface of the first medium,
   wherein the index of refraction of the second medium is greater than the index of refraction of the first medium.

4. An optical device comprising:
   a first medium having a thickness, the first medium at least partially forming a first layer and a second layer of the optical device, the first layer having a plurality of periodically spaced protruding portions surrounded by hollow portions having a depth less than the thickness of the first medium, the first layer having a depth identical to the depth of the hollow portions; and
   a second medium being dispersed within the hollow portions surrounding the plurality of periodically spaced protruding portions of the first layer,
   wherein the first layer is a photonic crystal, and the second layer is formed entirely of the first medium, and
   wherein the first layer and the second layer are integrated.

5. An optical device according to claim 4 wherein the index of refraction of the second medium is greater than the index of refraction of the first medium.

6. A method of manufacturing an optical device having a first layer functioning as an optical waveguide layer and a second layer functioning as a base layer, the method comprising the steps of:
   providing a resist layer on a surface of a first medium;
   removing portions of the resist layer to form vacancies;
   removing portions of the first medium corresponding to the vacancies to create cavities in the first medium, the depth of the cavities being less than a thickness of the first medium, and thereby defining the first layer and second layer;

filling the cavities in the first medium with a second medium, thereby forming the optical waveguide layer; and removing the resist layer and any excess film of the second medium from the surface of the first medium, wherein the index of refraction of the second medium is greater than the index of refraction of the first medium.

7. An optical device having a first layer functioning as an optical waveguide layer and a second layer functioning as a base layer, formed by a method comprising the steps of:

providing a resist layer on a surface of a first medium;

removing portions of the resist layer to form vacancies;

removing portions of the first medium corresponding to the vacancies to create cavities in the first medium, the depth of the cavities being less than a thickness of the first medium, and thereby defining the first layer and second layer;

removing the resist layer completely;

filling the cavities in the first medium with a second medium, thereby forming the optical waveguide layer; and removing any excess film of the second medium from the surface of the first medium, wherein the index of refraction of the second medium is greater than the index of refraction of the first medium.

8. An optical device having a first layer functioning as an optical waveguide layer and second layer functioning as a base layer, formed by a method comprising the steps of:

providing a resist layer on a surface of a first medium;

removing portions of the resist layer to form vacancies;

removing portions of the first medium corresponding to the vacancies to create cavities in the first medium, the depth of the cavities being less than a thickness of the first medium, and thereby defining the first layer and second layer;

filling the cavities in the first medium with a second medium, thereby forming the optical waveguide layer; and removing the resist layer and any excess film of the second medium from the surface of the first medium, wherein the index of refraction of the second medium is greater than the index of refraction of the first medium.

9. An optical device comprising:

a first medium having a thickness, the first medium at least partially forming an integrated first layer and second layer of the optical device, the first layer defining a plurality of periodically spaced hollow portions, the hollow portions having a depth less than the thickness of the first medium, the first layer having a depth identical to the depth of the hollow portions; and a second medium being dispersed within the hollow portions, wherein the first layer of the optical device forms a photonic crystal, and wherein the second layer of the device is formed at least partially of the first medium.

10. An optical device according to claim 9 wherein the index of refraction of the second medium is greater than the index of refraction of the first medium.

* * * * *